United States Patent [19]

Anderson et al.

[11] Patent Number: 5,991,600
[45] Date of Patent: Nov. 23, 1999

[54] INTEGRATION OF MOBILE STATION CHANNEL MEASUREMENT WITH PAGING CHANNEL DISPLACEMENT OPERATION IN A WIRELESS COMMUNICATIONS SYSTEM

[75] Inventors: Keith W. Anderson, Durham; Carl B. Toot, Jr., Raleigh, both of N.C.

[73] Assignee: Ericsson Inc., Research Triangle Park, N.C.

[21] Appl. No.: 08/890,609

[22] Filed: Jul. 9, 1997

[51] Int. Cl.[6] .................................................. H04B 7/00
[52] U.S. Cl. .......................... 455/38.3; 455/458; 455/574
[58] Field of Search .............................. 455/38.3, 68, 70, 455/161.2–161.3, 226.1–226.2, 343, 434–435, 466, 515–517, 575, 458, 574; 370/332, 337, 347, 310, 311

[56] References Cited

U.S. PATENT DOCUMENTS

| | | | |
|---|---|---|---|
| 5,404,355 | 4/1995 | Raith | 455/343 |
| 5,574,996 | 11/1996 | Raith | 455/343 |
| 5,590,396 | 12/1996 | Henry | 455/343 |
| 5,604,744 | 2/1997 | Andersson et al. | 370/347 |
| 5,794,146 | 8/1998 | Sevcik et al. | 455/515 |

FOREIGN PATENT DOCUMENTS

| | | |
|---|---|---|
| 0 319 219 A2 | 11/1988 | European Pat. Off. . |
| 0 522 631 A2 | 6/1992 | European Pat. Off. . |
| WO 95/12931 | 5/1995 | WIPO . |
| WO 95/12932 | 5/1995 | WIPO . |

OTHER PUBLICATIONS

EPO Standard Search Report RS 100227 US dated Mar. 9, 1998.

*Primary Examiner*—Curtis A. Kuntz
*Assistant Examiner*—George Eng
*Attorney, Agent, or Firm*—Jenkens & Gilchrist PC

[57] ABSTRACT

In connection with paging displacement operation, a mobile station delays entry into sleep mode in order to read a specified number of subsequent alternate (i.e., every other) additional paging channel slots to receive a paging message. During the paging channel slots located between those designated for reading paging displacement related paging messages, the mobile station makes more efficient use of limited battery supplied energy resources by making any requisite signal strength measurements.

8 Claims, 2 Drawing Sheets

INTEGRATION OF MOBILE STATION CHANNEL MEASUREMENT WITH PAGING CHANNEL DISPLACEMENT OPERATION IN A WIRELESS COMMUNICATIONS SYSTEM

BACKGROUND OF THE INVENTION

1. Technical Field of the Invention

The present invention relates to a wireless communications system and, in particular, to reducing mobile station power consumption in connection with paging and mobile station channel measurement operations.

2. Description of Related Art

It is well known that mobile stations (telephones) in wireless communications systems consume large amounts of power while operating in a talk mode. Consumption of power at a significant, albeit reduced, rate continues when the mobile station operates in a stand-by (i.e., idle) mode awaiting receipt or origination of a telephone call. For currently available portable, battery powered mobile stations, the on-board battery typically has a working lifetime of approximately eight hours in the stand-by mode and two hours in the talk mode. After such time expires, the battery must be recharged or replaced in order for the mobile station to continue to provide communications service.

Many methods and apparatus have been proposed to reduce power consumption in mobile stations and thus extend battery life between charges or replacement. A functional characteristic shared in common by many of these methods and apparatus is controlling mobile station operation by denying or reducing the supply of power to certain electronic components of the mobile station such as the transceiver, display or processor in order to reduce drain on the battery and extend useful battery life. This is commonly referred to as "sleep mode" operation. In order to obtain the maximum power conservation benefit from sleep mode operation, it is important to maximize the amount of time the supply of power is denied or reduced. Efficient mobile station operation, however, depends on mobile station monitoring of control and command signals transmitted from the serving wireless communications system as well as making downlink signal strength measurements. These monitoring and measurement functions require the mobile station to be adequately powered to enable transceiver and processor operation. Accordingly, a balance must be struck between power conservation (sleep mode) operation and power consumption operation. Given the availability of sleep mode functionality, a need exists for a method and apparatus by which the time spent in sleep mode can be maximized without adversely affecting the ability of the mobile station to be sufficiently operational to carry out any required monitoring and measurement functions.

Reference is now made to FIG. 1 wherein there is shown the structure of a hyperframe 10 for the forward (i.e., downlink) digital control channel (F-DCCH) as specified by the TIA/EIA Interim Standard IS-136 air interface. The hyperframe 10 is composed of two superframes 12. A first one these superframes 12(1) is commonly referred to as the "primary" superframe. A second one these superframes 12(2) is commonly referred to as the "secondary" superframe. Each superframe 12 is composed of a number of logical channels. A first one of these logical channels is a broadcast control channel (BCCH) commonly referred to as the fast broadcast control channel (F-BCCH) 14. This logical channel is used to broadcast control channel structure parameters and parameters that are essential for accessing the system. A next one of these logical channels is a broadcast control channel commonly referred to as the extended broadcast control channel (E-BCCH) 16. This logical channel carries broadcast information to mobile stations that is less time critical than the F-DCCH information. Another one of these logical channels is a broadcast control channel commonly referred to as the short message service (SMS) broadcast control channel (S-BCCH) 18. This logical channel is used to broadcast short message service messages to mobile stations. Yet another one of these logical channels is commonly referred to as the SMS point-to-point, paging and access response channel (SPACH) 20. This logical channel is used to broadcast information to specific mobile stations regarding SMS messages, paging messages, and to provide an access response channel. Another defined logical channel (RES) 22 is reserved at this point in time for a future but not yet specified use.

The SMS point-to-point, paging and access response channel 20 is divided into three logical sub-channels. A first one of these sub-channels is the paging channel (PCH) 24 that is dedicated to delivering pages and orders. A next one of these sub-channels is the access response channel (ARCH) 26 that is used to convey assignments to another communications resource or other responses to a mobile station access attempt. Another one of these sub-channels is the SMS channel (SMSCH) 28 that is used to deliver short message service messages to a specific mobile station.

One superframe 12 includes thirty-two slots 30 for use by the broadcast control channels (BCCH) 14, 16 and 18, the reserved channel (RES) 22, and the SMS point-to-point, paging and access response channel (SPACH) 20. Of these thirty-two available slots 30, when full rate operation is specified, between one and twenty-eight slots are made available to the SMS point-to-point, paging and access response channel 20 for use by the paging channels (PCH) 24, access response channels (ARCH) 26 and the SMS channels (SMSCH) 28. Any of the slots 30 used for paging channels 22 in the primary superframe 12(1) are repeated for use in the secondary superframe 12(2). The other SMS point-to-point, paging and access response channel 20 related information, such as with respect to the access response channel 26 and the SMS channel 28, may be different from one superframe 12 to a next superframe.

Each mobile station is assigned a particular one of the slots 30 in the SMS point-to-point, paging and access response channel 20 as its paging channel (PCH) 24. A mobile station camped on to the forward digital control channel reads its assigned paging channel 24 to determine whether a message has been broadcast addressed to its mobile station identification (MSID). If there is no such message detected, the mobile station further reads a page continuation (PCON) bit carried in the slot 30 for its assigned paging channel 24. If the page continuation bit is clear (PCON=0), the mobile station enters sleep mode until the next occurrence of its assigned paging channel 24 on to the forward digital control channel (not shown). If, on the other hand, the page continuation bit is set (PCON=1), a page displacement functionality is activated and the mobile station responds by delaying entry into sleep mode in order to read additional slots 30 in the SMS point-to-point, paging and access response channel 20. The number of slots 30 which are then read is specified by a paging channel displacement parameter (PCH_DISPLACEMENT) sent over the forward digital control channel.

When full rate operation is specified, the mobile station reads every other slot 30 in the SMS point-to-point, paging and access response channel 20 following its assigned paging channel 24 slot until the number of slots read equals the number specified in the paging channel displacement parameter or it receives a paging message addressed to its mobile station identification. In the situation where the mobile station has read the last available slot 30 in the SMS point-to-point, paging and access response channel 20 of the primary superframe 12(1), and the paging displacement parameter specifies that additional slots be read, the mobile station starts again reading with the second slot in the SMS point-to-point, paging and access response channel of the next primary superframe. In the situation where the mobile station has read the next-to-last available slot 30 in the SMS point-to-point, paging and access response channel 20 of the primary superframe 12(1), and the paging displacement parameter specifies that additional slots be read, the mobile station starts again reading with the first slot in the SMS point-to-point, paging and access response channel of the next primary superframe.

An example of paging displacement operation is shown in FIG. 2. In this example of full rate operation for the forward digital control channel, the SMS point-to-point, paging and access response channel 20 is assigned six slots 30(1)–30(6). Assume that a given mobile station is assigned a paging channel 24 that occurs in slot 30(1) of the first illustrated primary superframe 12(1). The mobile station wakes up and reads this paging channel 24 (as indicated by "X") to determine whether a message has been broadcast addressed to its mobile station identification (MSID). If there is no such message detected, the mobile station further reads a page continuation (PCON) bit. If the page continuation bit is clear (PCON=0), the mobile station enters sleep mode until the next occurrence (not shown) of its assigned paging channel 24 on the forward digital control channel. If, on the other hand, the page continuation bit is set (PCON=1), the mobile station reads every other slot (30(3), 30(5)) in the SMS point-to-point, paging and access response channel 20 following the slot 30(1) for its assigned paging channel 24 (as indicated by "Y") until the number of slots read equals the number specified in the paging channel displacement parameter (PCH_DISPLACEMENT=4 in this example) or it receives a paging message addressed to its mobile station identification. When the mobile station reads the next-to-last available slot 30(5) in the SMS point-to-point, paging and access response channel 20 of the first illustrated primary superframe 12(1), and the paging displacement parameter specifies that additional slots be read, the mobile station starts again reading with the first slot 30(1) in the SMS point-to-point, paging and access response channel of the second illustrated (i.e., the next following) primary superframe.

Not only must a mobile station wake up to read its assigned paging channel, it must also wake up periodically to make signal strength measurements. Although these measurements are not required to be performed at any particular place in the superframe, they are typically performed immediately before or after the paging data. These measurements are made on the control channels of cells in the wireless communications system which neighbor the cell currently serving the mobile station. The signal strength measurements are then processed by the mobile station for the purpose of making server selection determinations.

Paging displacement provides a mechanism by which the wireless communications system can force mobile stations to postpone entry into sleep mode and make additional reads on the forward digital control channel for the purpose of finding pages. Postponing entry into sleep mode and requiring transceiver and processor operation to make additional control channel reads places additional demands on the stored energy resources of the mobile station battery. Even the reading of a few extra slots can significantly shorten battery life. The additional periodic requirement to make signal strength measurements further serves as a drain on the limited energy resources of the battery. A method and apparatus are needed to maximize the time spent in sleep mode so as to conserve battery resources while simultaneously facilitating mobile station operation to make requisite signal strength measurements and support the paging channel displacement functionality.

SUMMARY OF THE INVENTION

When paging displacement functionality is activated by a command sent during a paging channel slot assigned to a given mobile station, that mobile station responds by delaying entry into sleep mode. This delay allows the given mobile station to read a specified number of subsequent additional paging channel slots for a paging message. In particular, the mobile station reads every other paging channel slot following the assigned paging channel slot until the specified number of slots have been read. In support of more efficient utilization mobile station battery supplied energy resources, the given mobile station further makes requisite signal strength measurements during the paging channel slots positioned between the every other paging channel slots specified to be read by the mobile station in connection with the activated paging displacement functionality.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF EMBODIMENTS

Figure 2:
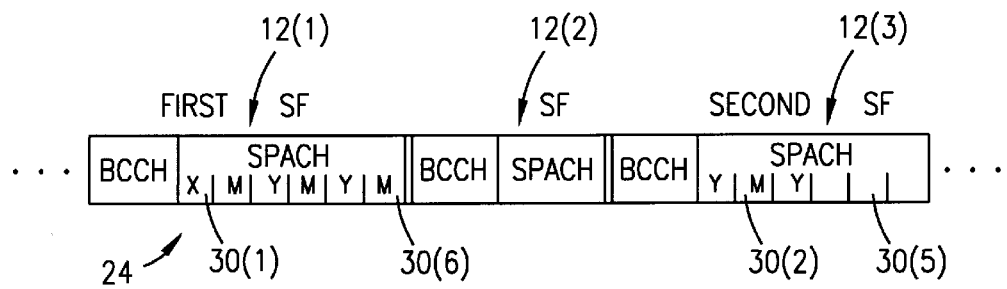
FIG. 2, previously described in part, illustrates an example of paging displacement operation along with integrated signal strength measurement.
Figure 3:
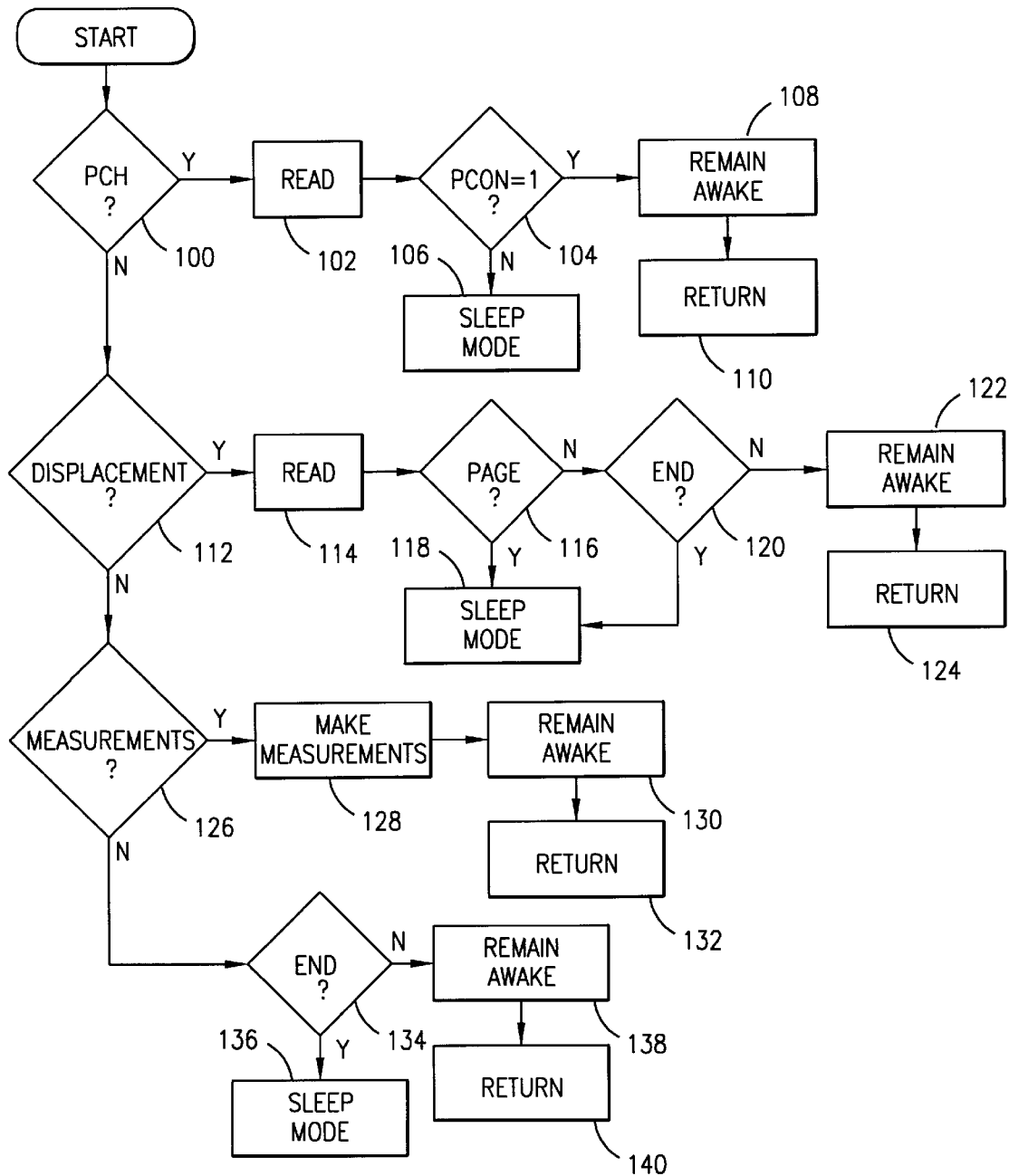
FIG. 3 is a flow diagram illustrating mobile station operation in accordance with the present invention to integrate paging displacement operation with signal strength measurement.

Reference is now made to FIG. 3 wherein there is shown a flow diagram illustrating mobile station operation in accordance with the present invention to integrate paging displacement operation with signal strength measurement. The process illustrated in the flow diagram concerns mobile station decision making in the awake mode with respect to what to do with and during slots 30 (FIG. 2) of the repeating hyperframe. In decision step 100, a determination is made as to whether the current slot is designated as the paging channel for that mobile station. If yes, the mobile station reads the slot in step 102 for paging channel related data. The read data may comprise a paging notification, or include an indication from the state of the included PCON bit (i.e., PCON=1) that paging continuation has been activated. A determination is then made in decision step 104 as to whether PCON=1. If not, the mobile station enters sleep mode in step 106, awakening again when necessary (such as for reading the paging channel or for making measurements). If yes, the mobile station remains awake in step 108, and then the process returns in step 110 to decide what to do with the next slot.

If the slot is not the paging channel (step 100), a determination is made in step 112 as to whether the current slot is designated for paging channel displacement use by that mobile station. If yes, the mobile station reads the slot in step 114 for a paging notification. A determination is then made in decision step 116 as to whether a paging notification was read. If yes, the mobile station enters sleep mode in step 118. If not, the mobile station then determines in decision step 120 whether paging continuation has terminated. If yes, the mobile station enters sleep mode in step 118. If not, the mobile station remains awake in step 122, and then the process returns in step 124 to decide what to do with the next slot.

If the slot is not for paging displacement (step 112), a determination is made in step 126 as to whether the mobile station has signal strength measurements which need to be made. If yes, the mobile station makes signal strength measurements in step 128, remains awake in step 130, and then the process returns in step 132 to decide what to do with the next slot. If no, the mobile station then determines in decision step 134 whether paging continuation has terminated. If yes, the mobile station enters sleep mode in step 136. If not, the mobile station remains awake in step 138, and then the process returns in step 140 to decide what to do with the next slot.

The process of FIG. 3 may be better understood in the context of a specific example. Accordingly, reference is again made to FIG. 2 wherein an example (discussed above) of paging displacement operation is shown. In this example of full rate operation for the forward digital control channel, the SMS point-to-point, paging and access response channel 20 is assigned six slots 30(1)–30(6). Assume that a given mobile station is assigned a paging channel 24 that occurs in slot 30(1) of the first illustrated primary superframe 12(1). The mobile station wakes up and reads this paging channel 24 (as indicated by "X") to determine whether a message has been broadcast addressed to its mobile station identification (MSID). If there is no such message detected, the mobile station further reads a page continuation (PCON) bit. If the page continuation bit is clear (PCON=0), the mobile station enters sleep mode until the next occurrence (not shown) of its assigned paging channel 24 on the forward digital control channel (not shown) or until such time as necessary to access the control channel or make measurements. If, on the other hand, the page continuation bit is set (PCON=1), the mobile station reads every other slot (30(3), 30(5)) in the SMS point-to-point, paging and access response channel 20 following the slot 30(1) for its assigned paging channel 24 (as indicated by "Y") until the number of slots read equals the number specified in the paging channel displacement parameter (PCH_DISPLACEMENT=4 in this example) or it receives a paging message addressed to its mobile station identification. When the mobile station reads the next-to-last available slot 30(5) in the SMS point-to-point, paging and access response channel 20 of the first illustrated primary superframe 12(1), and the paging displacement parameter specifies that additional slots be read, the mobile station starts again reading with the first slot 30(1) in the SMS point-to-point, paging and access response channel of the second illustrated (i.e., the next following) primary superframe. Furthermore, if the mobile station has signal strength measurements to perform, these measurements are made, while the mobile station remains awake, during the slots 30 (as indicated by "M") in the SMS point-to-point, paging and access response channel 20 following the slot 30(1) located between those slots utilized for paging channel displacement (as indicated by "Y").

By making measurements during these "M" slots 30, a more efficient use of limited mobile station battery resources is made. The mobile station now need not wake up at a later time (i.e., following paging activity or before next paging activity) to make the measurements. Furthermore, the mobile station need not waste resources remaining awake without performing any functions during the previously unused slots while waiting to complete the paging displacement operation.

Figure 1:
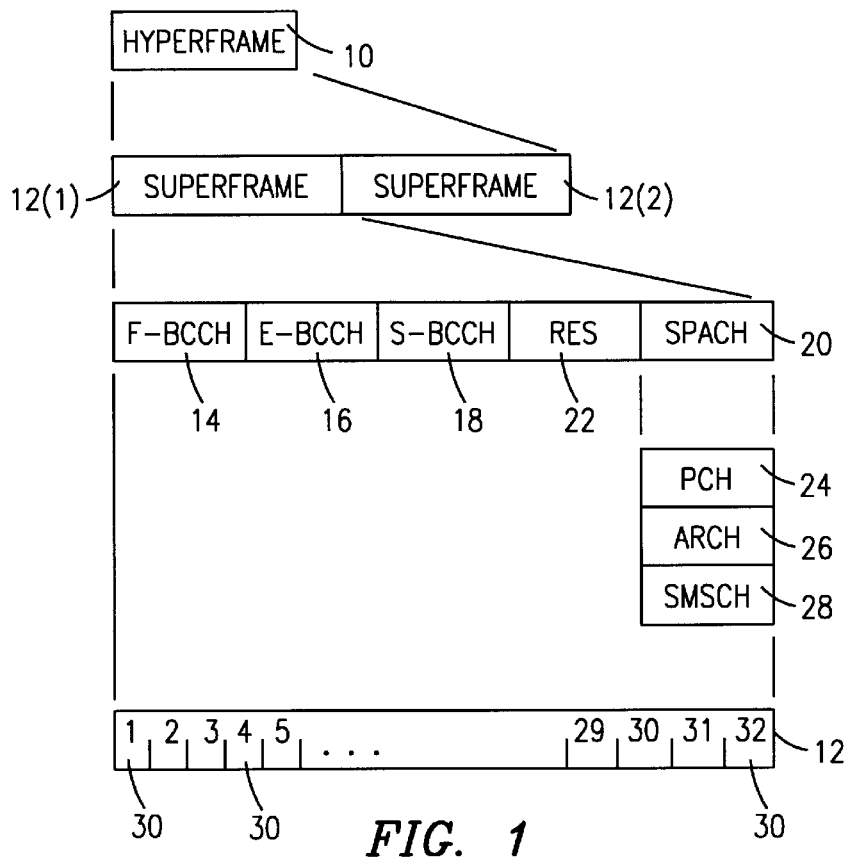
FIG. 1, previously described, illustrates the structure of a hyperframe for the forward (i.e., downlink) digital control channel (F-DCCH) as specified by the TIA/EIA Interim Standard IS-136 air interface.
Figure 4:
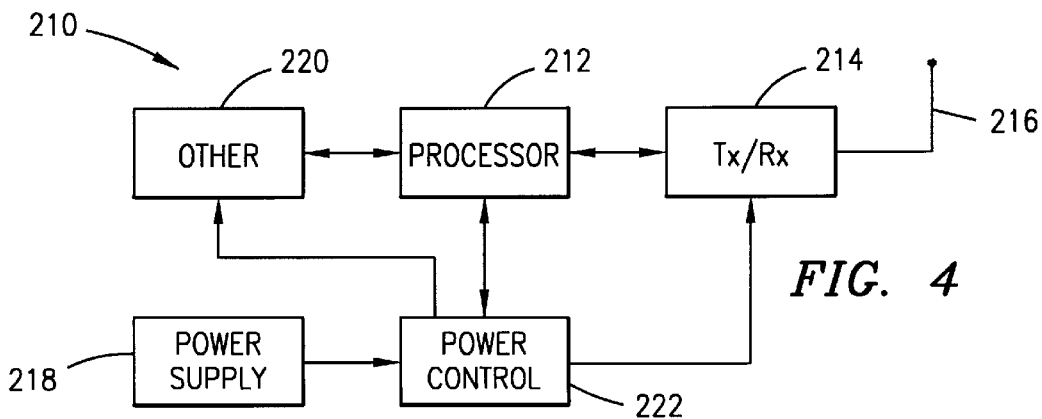
FIG. 4 is a simplified block diagram of a mobile station.

Reference is now made to FIG. 4 wherein there is shown a simplified block diagram of a mobile station 210 operating in accordance with the present invention. The mobile station 210 includes a processor 212 connected to a transceiver 214. An antenna 216 is connected to the transceiver 214 for transmitting and receiving communications (both voice and data) over a wireless communications system. Power for the mobile station 210 is supplied by a renewable or replaceable power source 218 typically comprising a battery. There are other components 220 included in the mobile station 210 (like a handset, keypad, etc.) and not shown in FIG. 1 whose nature, operation and interconnection with the illustrated components are known to those skilled in the art.

The mobile station 210 functions in accordance with four primary modes of operation. The first mode comprises a "talk" mode wherein a subscriber uses the mobile station 210 to communicate over the wireless communications system. As is well known to those skilled in the art, because nearly all of the components of the mobile station 210 are operating during the talk mode, this mode of operation consumes an enormous amount of power output from the power source 218. Such power consumption will quickly drain the power source 218.

The second mode comprises a "stand-by" (or idle) mode wherein the mobile station 210 awaits use by the subscriber in originating or receiving a telephone call or messages. While in the stand-by mode, some of the components of the mobile station 210 continue to operate and thus continue to require and consume power (perhaps at a reduced rate) supplied by the power source 218. Other components, though, are unused and not operating and thus do not significantly consume power. Accordingly, overall power consumption occurs at a reduced rate in comparison to that experienced with the talk mode.

The third mode of operation comprises an "off" mode where the subscriber simply turns off the mobile station 210. In fact, placement of the mobile station 210 in the off-mode often involves using a switch to disconnect the power source 218 from many of the mobile station components. Accordingly, in the off mode little to no power is drained from the power source 218 by the mobile station 210 because few, if any, of the components of the mobile station continue to operate. Placement of the mobile station in the off mode provides the most effective means for conserving power supplied by the power source 218.

The fourth mode of operation comprises a "sleep" mode that may be described as being relatively positioned, as far as operation is concerned, somewhere between the previously described stand-by and off modes of operation. In the sleep mode of operation, certain ones of, but not necessarily all of, the components of the mobile station 210 are temporarily shut off (denied power) in order to conserve the drain of power from the power source 218. By denying power to such components, overall power consumption by the mobile station 210 occurs at a reduced rate in comparison to that experienced with the stand-by mode.

To facilitate this fourth mode of operation, the mobile station 210 further includes power control circuitry 222. In accordance with mobile station programming (like that illustrated in FIG. 3) as executed by the processor 212, power control circuitry 222 regulates the supply of power to the mobile station 210 components. When operation in the sleep mode is specified by mobile station programming, the power control circuitry 222 denies power to certain components of the mobile station 210 (e.g., the transceiver 214). When necessary, and again in accordance with mobile station programming, the mobile station 210 awakens back into the stand-by mode ready to receive and transmit telephone calls (by further entering into the talk mode), as well as to receive messages (such as pages) and make any needed signal strength measurements.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for integrating paging channel displacement operation and downlink signal strength measurement operation with respect to mobile station operation, comprising the steps of:

reading a certain number of every other paging channel designated slots of a forward control channel following an assigned paging channel slot for mobile station paging messages during the paging channel displacement operation; and making downlink signal strength measurements within the paging channel displacement operation, the measurements made during those paging channel designated slots following the assigned paging channel slot that are located between the certain number of every other paging channel designated slots of the forward control channel.

2. The method as in claim 1 further including the step of entering into a sleep mode of operation following the reading of the every other paging channel designated slots.

3. The method as in claim 1 further including the step of entering into a sleep mode of operation following reading of a mobile station paging message.

4. The method as in claim 1 wherein the paging channel designated slots are located within a short message service (SMS) point-to-point, paging and access response channel (SPACH) of the forward control channel.

5. A mobile station, comprising:

a transceiver for reading a forward control channel for paging messages, and for making downlink signal strength measurements; and a processor connected to the transceiver and operating to cause the transceiver during a paging channel displacement operation to read a certain number of every other paging channel designated slots of the forward control channel following an assigned paging channel slot for mobile station paging messages, and further make downlink signal strength measurements within the paging channel displacement operation, the measurements made during those paging channel designated slots following the assigned paging channel slot that are located between the certain number of every other paging channel designated slots of the forward control channel.

6. The mobile station as in claim 5 further including means for denying power to the transceiver to cause entry into a sleep mode of operation following the reading of the every other paging channel designated slots.

7. The mobile station as in claim 5 further including means for denying power to the transceiver to cause entry into a sleep mode of operation following reading of a mobile station paging message.

8. The mobile station as in claim 5 wherein the paging channel designated slots are located within a short message service (SMS) point-to-point, paging and access response channel (SPACH) of the forward control channel.

* * * * *